(12) United States Patent
Buchenrieder et al.

(10) Patent No.: US 7,206,829 B1
(45) Date of Patent: Apr. 17, 2007

(54) METHOD FOR OPERATING A NETWORK COMPUTER

(75) Inventors: Klaus Buchenrieder, Riemerling (DE); Rainer Kress, Poering (DE); Alexander Sedlmeier, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/409,813

(22) Filed: Sep. 30, 1999

(30) Foreign Application Priority Data

Sep. 30, 1998 (DE) ................ 198 44 942

(51) Int. Cl.
*G06F 15/173* (2006.01)
(52) U.S. Cl. .................. 709/223; 709/224; 707/10
(58) Field of Classification Search ........... 709/106, 709/219, 102, 220, 228, 223, 224; 707/8, 707/10; 378/207; 717/173; 713/100
See application file for complete search history.

(56) References Cited

U.S. PATENT DOCUMENTS

| | | | |
|---|---|---|---|
| 5,031,089 A | | 7/1991 | Liu et al. |
| 5,193,186 A | * | 3/1993 | Tamaki et al. ............ 709/106 |
| 5,802,290 A | | 9/1998 | Casselman |
| 5,812,857 A | * | 9/1998 | Nelson et al. ............ 717/173 |
| 5,848,411 A | * | 12/1998 | Yamagishi ............... 707/8 |
| 6,012,088 A | * | 1/2000 | Li et al. ................ 709/219 |
| 6,247,128 B1 | * | 6/2001 | Fisher et al. ............ 713/100 |
| 6,256,732 B1 | * | 7/2001 | Cromer et al. ............ 713/2 |
| 6,298,370 B1 | * | 10/2001 | Tang et al. ............. 709/102 |
| 6,325,540 B1 | * | 12/2001 | Lounsberry et al. ....... 378/207 |

FOREIGN PATENT DOCUMENTS

| | | |
|---|---|---|
| DE | 43 35 690 A1 | 8/1994 |
| DE | 196 14 991 A1 | 10/1996 |
| DE | 196 54 766 A1 | 7/1997 |
| DE | 198 15 865 A1 | 12/1998 |
| EP | 0 860 773 A1 | 8/1998 |
| EP | 0 909 057 A2 | 4/1999 |
| WO | WO 97/49042 | 12/1997 |

OTHER PUBLICATIONS

XP-002135307—Jean et al., "Dynamic Reconfiguration to Support Concurrent Applications", pp. 302-303.
XP-002135309—McKay et al., "Dynamic Specification of XC6200 FPGAs by Partial Evaluation", pp. 308-309.
Theimer et al., "Finding Idle Machines in a Workstation based Distributed System", pp. 112-122.
XP000384246—Ju et al, "Parallel Computing Using Idle Workstations", Operating Systems Review (SIGOPS) Jul. 27, 1993, No. 3, New York, pp. 87-96.
Nisan et al., "Globally Distributed Computation over the Internet—The Popcorn Project", pp. 592-601.
XP-000862914—Theimer et al., "Preemptable Remote Execution Facilities for the V-System", pp. 2-12.
XP-002209552—Takagi et al., "Ninflet: a migratable parallel objects framework using Java", pp. 1063-1078.

* cited by examiner

*Primary Examiner*—Jason Cardone
*Assistant Examiner*—Adrian M. Mirza
(74) *Attorney, Agent, or Firm*—Bell, Boyd & Lloyd LLP

(57) ABSTRACT

A method for operating a network computer wherein the network computer has reconfigurable hardware that can be connected to a network. The hardware includes one FPGA, a plurality of FPGAs, or a plurality of FPGAs with processors and memory. Advantageously, the computer is dynamically structurable via the network.

4 Claims, 1 Drawing Sheet

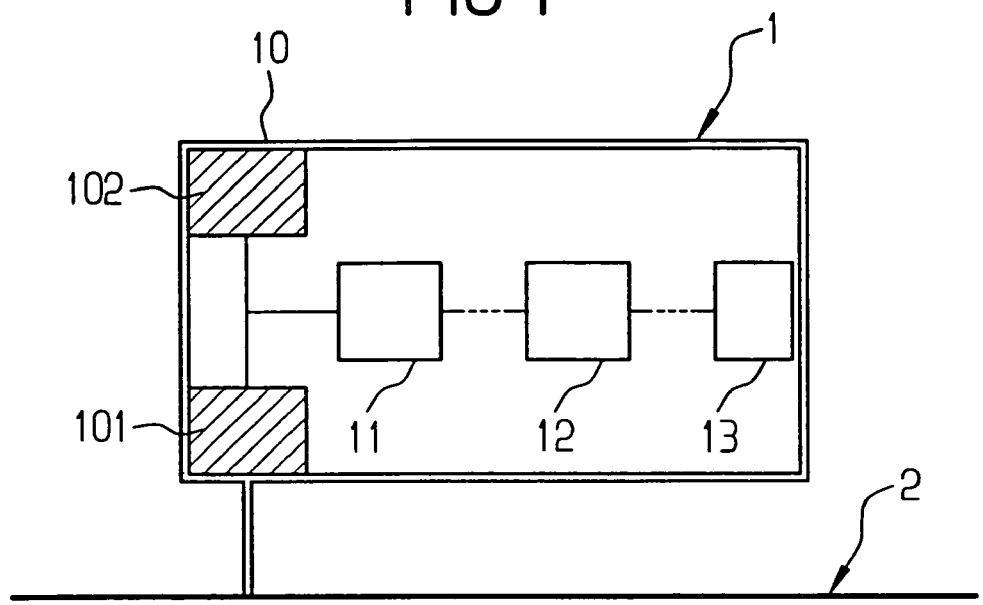
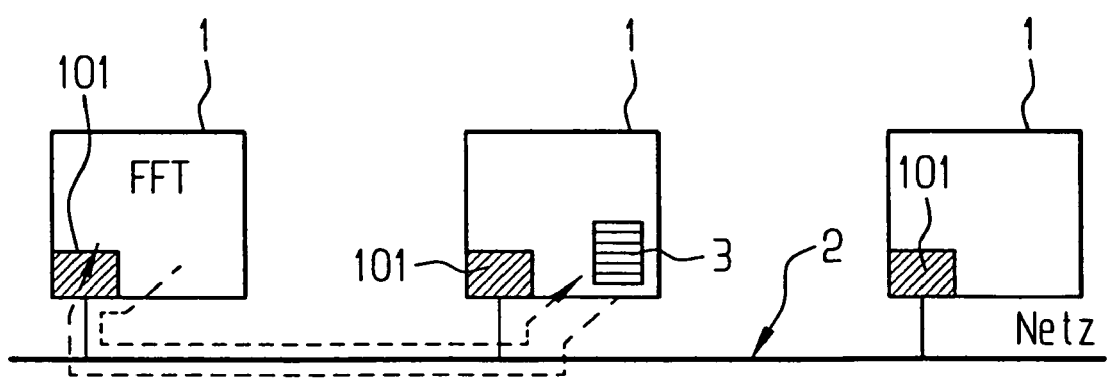

METHOD FOR OPERATING A NETWORK COMPUTER

BACKGROUND OF THE INVENTION

1. Field of the Invention

The present invention relates to a method for operating a network computer wherein the computer has reconfigurable hardware which can be connected to the network and which, accordingly, is dynamically structurable via the network.

2. Description of the Prior Art

Network computers are known which receive programs from a server. Such network computers, such as those offered by Sun Microsystems, are those which are situated at the user. Generally, such a network computer includes a monitor, a keyboard, a CPU, a memory and an interface for the access to a network. A central computer is not only responsible for the data administration, as given client and/or server, but also responsible for the applications. The required program parts are loaded and conducted via the network for starting an application at the network computer in order to process data; for example, to carry out word processing. Further required program parts are automatically reloaded. All data is centrally stored. One advantage is the small administrative expenditure at the user workstation (see publications of the company Sun Microsystems with the title "JavaStation—An Overview" 1996, retrievable under http://www.sun.com/javastation/whitepapers/javastation).

These network computers are supported by networks such as intranets or internet. The hardware architecture of such a network computer is fixed. Further connections of computers via networks are standard; given workstations, for example. One can gain access to data of other computers via the network (Ethernet, for example) or individual program parts. What is referred to as tasks or complete programs can be started by remote control on other computers and can be calculated.

The present invention is, therefore, based on the object of providing a method for the operation of a network computer that can be structured.

SUMMARY OF THE INVENTION

Accordingly, pursuant to the teachings of the present invention, a preferred and advantageous method for the operation of a structurable computer which is connected to a network is provided which includes the steps of:

independent loading and/or loading in response to a specific request of configuration data, that is allocated to this computer, into the computer via the network;

configuring the hardware of the computer corresponding to this configuration data; and processing a task with the computer configured this way.

A specific advantage of the structurable computer is that it is dynamically structurable via the network; i.e., that the configuration of the hardware can be dynamically changed via the network.

In an embodiment, a method for the dynamic structuring of the structurable computer, which method is advantageously compatible with the method given above, includes the steps of:

processing a task with the computer configured for this task;

configuring, already before completion of the processing of this task, a part of the hardware of the computer that is no longer necessary for this processing, for the processing of a different task by loading the configuration data allocated to this other task into the computer via the network.

The calculating speed can be considerably increased by such a dynamic structuring, particularly when the part of the hardware of the computer that is no longer necessary for the processing of the one task is configured for the processing of the other task such that the processing of the other task already can be started before the processing of the one task has been completed.

Apart from the advantage of the dynamic reconfigurability, the structurable network computer has the advantages that it is expandable in a modular manner and that it can efficiently solve dedicated programmed problems as either a composite or individually.

Structurable in the above sense means that the network computer initially does not exhibit a structure; i.e., that all hardware resources are the same. Subsequent to the programming or configuration, the network computer exhibits a structure for a specific task. The structure can be changed at any time and can be adjusted to a new task by reconfiguration.

Dynamic reconfiguring means that the configuration also may occur during the running time; i.e., that a different part of the computer already can be reconfigured while the structurable network computer processes a task. The structurable network computer independently can establish contact either with other processor elements via the network, with other network computers or with normal host computers, for example, in order to solve problems or provide support with respect to their processing.

Additional features and advantages of the present invention are described in, and will apparent from, the Detailed Description of the Preferred Embodiments and the Drawings.

DESCRIPTION OF THE DRAWING

FIG. 1 shows a structurable network computer in accordance with the present invention that is connected to a network by an interface; and FIG. 2 shows a plurality of network computers that are respectively connected to a network by an interface.

DETAILED DESCRIPTION OF THE PREFERRED EMBODIMENTS

The structurable network computer that is generally referred to as 1 has a reconfigurable hardware or hardware platform 10 that can be connected to a network 2 (the Internet or Intranet, for example), via an interface 101. The hardware or hardware platform 10 has, in turn, one FPGA 11, a plurality of FPGAs 11, one FPGA 11, a plurality of FPGAs 11 and one processor 12, a plurality of processors 12 and one storage (memory) 13 or a plurality of storages 13.

All FPGAs and, as warranted, processors 12 and storages 13 are connected to the interface 101. The hardware 10 can be accessed via the network 2 by this interface 101 for an acceleration of algorithms and/or an emulation of ASICs for example.

A user of the computer 1 can have direct access to the hardware 10 by a further, but not necessary, interface 102. When turned on, or in response to a specific request of configuration data allocated to it, the computer 1 or the hardware 10 loads itself via the network 2 and subsequently behaves corresponding to its configuration.

Initially, the computer 1 does not have a structure—all hardware resources being the same. Given activation or a specific request, the computer 1 structures itself for a dedicated task. The structure can be changed for a new task at any time. The configuration code is centrally managed on a server, for example.

The computer 1 can dynamically reload parts of the configuration; i.e., that it configures a part of its hardware 10 while a calculation has not yet completed in another part. Therewith, it enables the solving of complex problems which would not have completely fit on the available hardware resources. The configuration data is centrally managed and can be retrieved via the network, if required.

When a plurality of these computers 1 are connected to a network 2, as shown in FIG. 2, it is possible that they both support each other and support a network computer (not shown), which only has a processor and a memory and does not have FPGAs. It can be, for example, proceeded such that a computer 1 that has to execute a task deposits a list 3, which is available to all other network computers and has all tasks to be processed, in a storage of another computer 1. A computer 1 that is free at that time looks for a task in this list 3. A FFT (Fast Fourier Transformation) for example, takes the necessary configuration data from a central server and configures itself specifically for this task. As a specialist, it can execute this task highly efficiently and fast. Subsequent to the execution, it returns the calculated data to the original computer.

The network computer communicates with other network computers via what is referred to as objects, for example. The object includes three components, for example: Routing, code and data. The routing component indicates where to send the object. The code component includes two sections, a software part and a hardware part. Both parts are functionally equivalent. The software is executed on a virtual machine in the network computer. What is thereby guaranteed is that the software can be executed on each arbitrary network computer. However, the network computers can differ with respect to their speed, for example. When the execution occurs in hardware, a configurable part of the network computer is configured with the aid of the code in the hardware part of the object. The code is designed such that it can run on a plurality of different hardware platforms that are to be configured. The software part and the hardware part are optional. Therefore, pure data objects or objects without a hardware part also can be sent. The data component contains private data of the object.

A possible embodiment of an object is described below, by way of example, whereby the executing network computer, which wishes to execute a program, is referred to as network computer A and the network computer, which receives a data object, is referred to as network computer B.

1. The network computer A sends a call to all network computers that are situated in the network to send it information about their free resources.

2. The answering network computers send their routing information and their information about free resources. Further information is contained therein, such as those functions that the computer is particularly good at.

A version for the general calling of network computer A: Instead of sending a call to all, the network computer A also can ask an information master, if present, for the corresponding information.

3. A network computer A chooses a network computer, the network computer B for example. It attaches the corresponding routing information to the object to be calculated and sends the object.

4. The network computer B receives the object, calculates it and returns the calculated data as a new object. The calculation may occur in software, hardware or mixed.

A network computer can be connected to the network or disconnected to the network at any time.

An object with calculated results is only released by the calling network computer when a) further calculations can be calculated independently of the predecessor, or b) when calculations that are dependent on one another are entirely completed.

The network computer B also can assign suborders in that it, in turn, forwards an object.

An object can contain security information. Individual network computers, groups or network segments can be given, for example. Other network computers are then not considered.

Network computers can exchange their objects in an encoded fashion, via PGP (Pretty Good Privacy Encoding), for example. For this purpose, network computer B can send its public key to network computer A, for example. Network computer A can therewith encode the object. The object can be decoded only by network computer B, since it is the only one with the private key.

Although the present invention has been described with reference to specific embodiments, those of skill in the art will recognize that changes may be made thereto without departing from the spirit and scope of the invention as set forth in the hereafter appended claims.

We claim:

1. A method for operating a computer that is connected to a network, the method comprising the steps of:

providing that the computer have an FPGA hardware structure which may be physically reconfigured;

loading first configuration data including a software portion and a hardware portion for a first task, allocated to the computer, into the computer via the network wherein the loading is initiated either independently or in response to a specific request;

automatically reconfiguring the FPGA hardware structure of the computer with the aid of the hardware portion of the first configuration data so that the computer exhibits a hardware structure configured to the first task; and processing the first task with the computer configured with the first configuration data.

2. A method for operating a computer as claimed in claim 1, further comprising the step of:

configuring, prior to completion of the step of processing the first task, a part of the hardware of the computer that is no longer necessary for the step of processing the first task, for processing a second task by loading second configuration data allocated to the second task into the computer via the network.

3. A method as claimed in claim 2, further comprising the step of:

processing the second task prior to the completion of the step of processing the first task.

4. A method for operating a computer that is connected to a network, the method comprising the steps of:

loading first configuration data via the network into a computer having an FPGA hardware structure which may be physically reconfigured; wherein said first configuration data includes a software portion and a hardware portion for a first task, and wherein the loading is initiated either independently or in response to a specific request;

automatically reconfiguring the FPGA hardware structure of the computer with the aid of the hardware portion of the first configuration data so that the computer exhibits a hardware structure configured to the first task; and processing the first task with the computer configured with the first configuration data.

* * * * *